United States Patent [19]

Pancotti

[11] Patent Number: 5,156,527
[45] Date of Patent: Oct. 20, 1992

[54] MAIN HELICOPTER ROTOR

[75] Inventor: Santino Pancotti, Gallarate, Italy

[73] Assignee: Agusta S.P.A., Frazione Cascina Costa, Italy

[21] Appl. No.: 681,105

[22] Filed: Apr. 5, 1991

[30] Foreign Application Priority Data

Apr. 6, 1990 [IT] Italy ................. 67263 A/90

[51] Int. Cl.⁵ ............................................. B63H 1/06
[52] U.S. Cl. .................... 416/131; 416/134 A; 416/140; 416/141; 416/244 R; 416/500
[58] Field of Search ............... 416/134 A, 141, 140 R, 416/140 A, 244 R, 244 C, 244 D, 131, 500

[56] References Cited

U.S. PATENT DOCUMENTS

| | | | |
|---|---|---|---|
| 3,700,352 | 10/1972 | Gorndt | 416/141 X |
| 4,231,705 | 11/1980 | Watson | 416/141 X |
| 4,281,966 | 8/1981 | Duret et al. | 416/134 A |
| 4,297,078 | 10/1981 | Martin | 416/140 A X |
| 4,306,836 | 12/1981 | Mayerjak | 416/141 X |
| 4,323,332 | 4/1982 | Fradenburgh | 416/134 A |
| 4,352,632 | 10/1982 | Schwarz | 416/141 X |
| 4,361,415 | 11/1982 | Aubry | 416/141 X |
| 4,580,945 | 4/1986 | Miller | 416/134 A |

FOREIGN PATENT DOCUMENTS

| | | | |
|---|---|---|---|
| 466336 | 7/1950 | Canada | 416/134 A |
| 633402 | 11/1937 | Fed. Rep. of Germany | 416/244 D |

Primary Examiner—Edward K. Look
Assistant Examiner—Todd Mattingly
Attorney, Agent, or Firm—Kane, Dalsimer, Sullivan, Kurucz, Levy, Eisele and Richard

[57] ABSTRACT

A main helicopter rotor has a number of blades, and a drift shaft supporting at its top end, a hub consisting of a rigid annular body integral and coaxial with the drive shaft. An elastically deformable torodial body surrounds and is connected to the annular body for defining, with the same, a closed-section torodial assembly. Each blade is connected to the hub by a connecting element extending at least partially through the annular body and the torodial body, and connected respectively to the same by a first and second spherical elastomeric bearing.

9 Claims, 4 Drawing Sheets

MAIN HELICOPTER ROTOR

BACKGROUND OF THE INVENTION

The present invention relates to a main helicopter rotor.

In particular, the present invention relates to a rotor of the type comprising a drive shaft designed to turn about its axis; a hub integral with the drive shaft; a number of blades extending substantially radially outwards from the hub and each having a connection device for connection to the hub; a pitch change device connected to each said connecting device; and means for connecting each said connecting device to the hub, said connecting means comprising a first spherical elastomeric bearing located between a respective connecting device and the hub and defining the focal point of a respective blade.

Known rotors of the aforementioned type are generally referred to as "semirigid", wherein each said connecting device comprises a respective elastic element located between the hub and a respective blade, and designed to absorb both the loads due to centrifugal force and part of the shearing stress.

The main drawback of known rotors of the aforementioned type is the failure of said elastic elements, normally consisting of metal blades integral at one end with the hub and extending radially outwards of the same, to meet the conflicting requirements of relatively low rigidity when the rotor is operative, and relatively high rigidity when the rotor is idle and possibly subjected to wind. In addition to being deformable in flight, in response to the shear exerted on the respective blades, so as to generate the required control moments, said elastic elements are also called upon to support the blades in the correct position in relation to the ground when the rotor is idle.

As such conflicting requirements are rarely, if ever, achievable in actual practice, for supporting the blades when the rotor is idle, known rotors of the aforementioned type usually feature mobile supporting elements of the type normally employed on so-called "articulated" rotors.

A further point to note in connection with known "semirigid" rotors of the aforementioned type is that cyclic and collective pitch control of the blades depends on the torsional deformability of said elastic elements, which must be relatively long for maintaining within acceptable limits the stress exerted by the pitch change controls.

As a consequence of the above, the diameter and, therefore, drag of the hub on known rotors of the aforementioned type are usually considerable.

SUMMARY OF THE INVENTION

The aim of the present invention is to provide a rotor of the aforementioned type designed to enable the elimination of mobile members for supporting the blades when the rotor is idle.

A further aim of the present invention is to provide a rotor of the aforementioned type featuring a hub which is both relatively straightforward in design and of relatively small diameter.

With this aim in view, according to the present invention, there is provided a rotor of the aforementioned type, characterised by the fact that said hub comprises an annular body integral and coaxial with said drive shaft, and an elastically deformable toroidal body surrounding and connected to said annular body, so as to define, with the same, a closed-section toroidal assembly; each said connecting device extending through said toroidal body and at least partially through said annular body; and said connecting means comprising a second spherical elastomeric bearing located between a respective said connecting device and said toroidal body.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
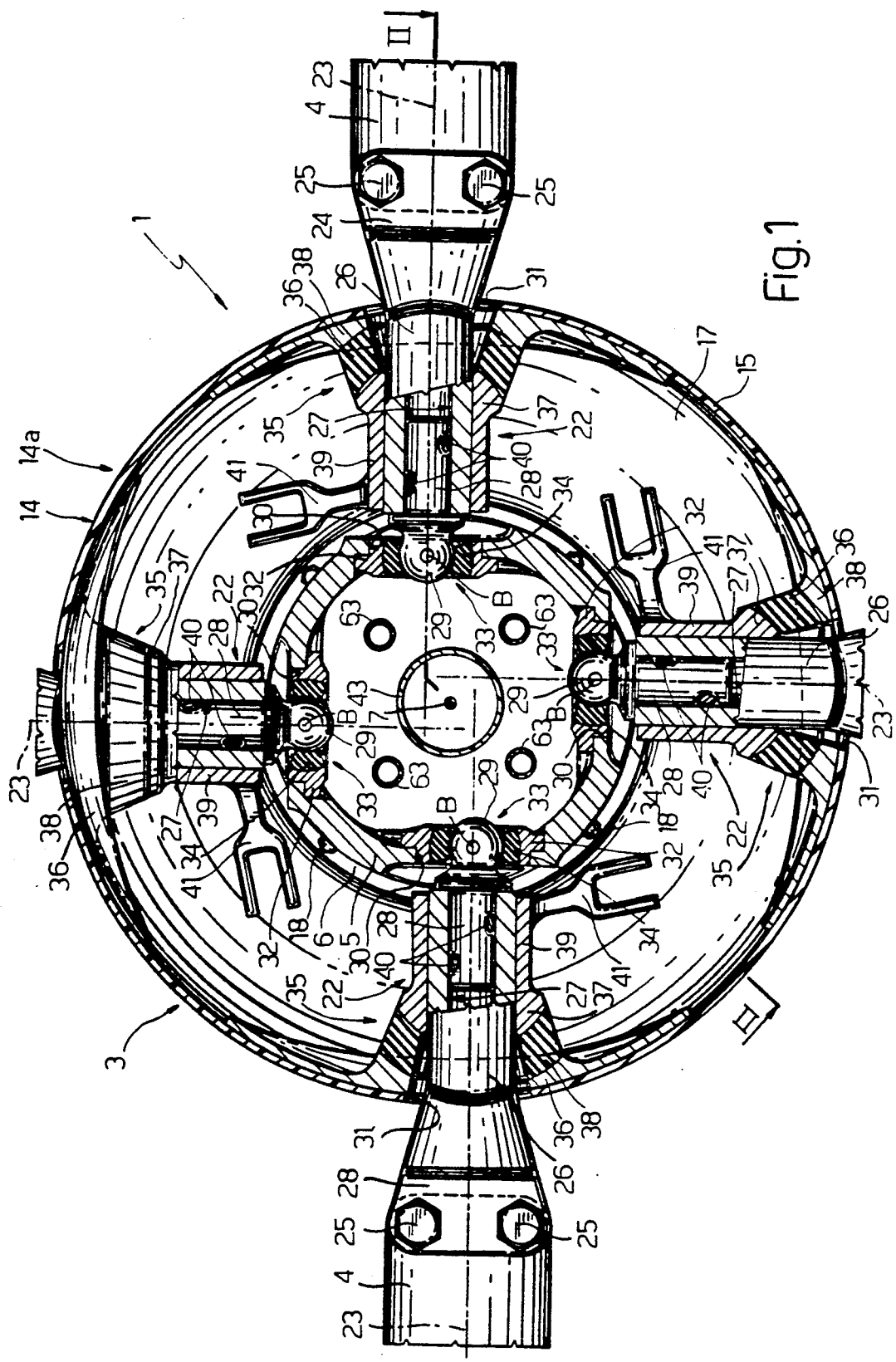
FIG. 1 shows a cross section, with parts removed for simplicity, of a first preferred embodiment of the helicopter rotor according to the present invention.
Figure 2:
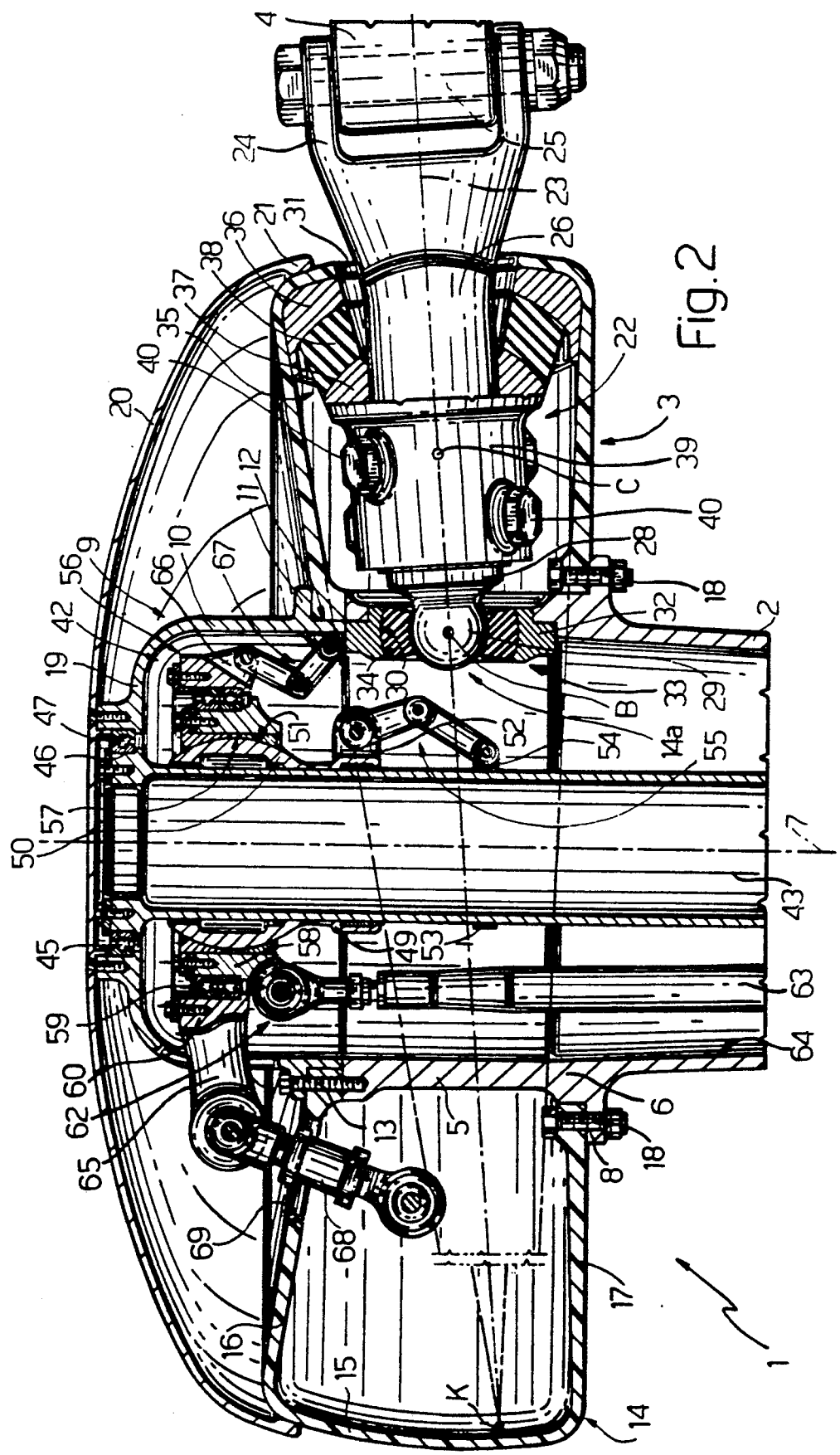
FIG. 2 shows a section along line II—II in FIG. 1.

Number 1 in FIGS. 1 and 2 indicates a main rotor of a helicopter (not shown). Rotor 1 comprises a tubular drive shaft 2 extending substantially vertically and connected angularly at the bottom end to the output of a reduction gear casing (not shown) in turn connected to the output of the helicopter drive (not shown).

As shown in FIG. 2, the top portion of shaft 2 is connected to a hub 3 for connecting to shaft 2 a number of blades 4 extending substantially radially outwards from a hub 30.

Hub 3 comprises an annular body 5 extending upwards form an annular projection 6 on the top end of shaft 2. Annular body 5 is cylindrical, coaxial with axis 7 of shaft 2, and constitutes an end extension of shaft 2 with which it is formed in one piece.

Annular body 5 is defined at the bottom by an annular flange 8 extending outwards from annular projection 6, and is closed at the top by a cup-shaped bell 9 mounted with its concave side facing downwards, and comprising a cylindrical lateral wall 10 contacting the top end of annular body 5. In particular, wall 10 presents an outer annular flange 11 defining, with the top end of body 5, a groove 12 fitted through with screws 13 for connecting bell 9 to annular body 5.

Hub 3 also comprises a toroidal body 14 surrounding annular body 5 and having a substantially C-shaped section with its concave side facing body 5. Toroidal body 14 is preferably made of composite synthetic material, and comprises a substantially cylindrical, intermediate portion 15 coaxial with axis 7, and two annular flanges 16 and 17 extending inwards from the top and bottom ends respectively of intermediate portion 15.

Toroidal body 14 is connected integral with annular body 5 by connecting flanges 16 and 17 to the opposite ends of the same. In particular, the inner edge of flange 16 engages groove 12 and is fitted inside the same by screws 13, while the inner edge of flange 17 rests on flange 8 and is connected to the same by a number of through bolts 18. Open-section toroidal body 14 thus forms, with annular body 5, a closed-section toroidal assembly 14a.

As shown in FIG. 2, bell 9 presents a top wall 19 substantially perpendicular to axis 7 and fitted with a convex cover 20 coaxial with axis 7 and resting by edge 21 on the outer surface of intermediate portion 15 of toroidal body 14.

The inner end of each blade 4 is connected to hub 3 by a connecting element 22 extending substantially radially in relation to shaft 2 along a respective axis 23 coinciding with the axis of respective blade 4. Each connecting element 22 is located between flanges 16 and 17, at least one of which is conical with its concave side facing outwards. In any case, flanges 16 and 17 are so shaped that the generating lines of flanges 16 and 17 lying in a plane through axis 23 and axis 7 meet at point "K" on axis 23 when, as shown in FIG. 2, blades 4 move on to the stabilized hovering "cone".

Each connecting element 22 comprises, on the outer end, a fork 24 connected to the inner end of respective blade 4 by two bolts 25 substantially parallel to axis 7, and, on the inner end, a rod 26 integral with fork 24 and having an axial hole 27 engaged by a cylindrical rod 28 projecting from hole 27 towards axis 7 and terminating in a spherical head 29 having its center B on axis 23. Each connecting element 22 engages a substantially radial hole 30 formed through body 5, and a substantially radial hole 31 formed through portion 15 of toroidal body 14.

Each hole 30 is engaged by the outer show 32 of a respective spherical elastomeric bearing 33, the inner show of which is defined by respective spherical head 29 connected to respective outer show 32 via a layer 34 of reinforced elastomeric material.

Each connecting element 22 is secured to toroidal body 14 by a further spherical elastomeric bearing 35 mounted with its concave side facing axis 7. Each bearing 35 presents its center C on respective axis 23, inside toroidal body 14, and comprises an annular outer show 36 connected integral with annular portion 15 and coaxial with respective hole 31; and an annular inner shoe 37 coaxial with respective axis 23 and connected to outer shoe 36 by an annular layer 38 of reinforced elastomeric material. Inner shoe 37 is integral with the end of a coupling 39 fitted on to respective rod 26 and fitted through with two diametrical bolts 40 perpendicular to each other and offset axially along coupling 39 for rendering coupling 39, respective rod 26 and respective rod 28 integral with one another. Coupling 39 also presents a substantially radial outer fork 41 for connecting respective blade 4 to a pitch change device indicated as a whole by 42 (FIG. 2).

As shown particularly in FIG. 2, device 42 comprises a tubular, substantially cylindrical shaft 43 fixed inside shaft 2 and connected integral, at the bottom end (not shown), with the casing (not shown) of said drive. The top end of shaft 43 extends over hub 3 to engage, via bearing 45, a hole 46 formed through a central projection 47 in wall 19 of bell 9.

Device 42 also comprises a cylindrical coupling 49 mounted in rotary and axially-sliding manner on to the top end portion of shaft 43. The top portion of coupling 49 consists of an enlargement or head 50 defined externally by a spherical-crown-shaped surface 51, while the bottom portion of coupling 49 presents an outer radial tab 52.

Beneath coupling 49, shaft 43 is fitted integral with a further cylindrical coupling 53 having an outer radial tab 54 connected to tab 52 by a link 55 enabling axial displacement of coupling 49 along shaft 43, while at the same time preventing coupling 49 form rotating about the axis of shaft 43.

Device 42 also comprises a known "oscillating plate" assembly 56 supported on shaft 43 beneath bell 9, and having a spherical central seat 57 connected to surface 51. As shown particularly in FIG. 2, assembly 56 comprises an inner ring 58, hereinafter referred to as the "fixed ring", locked angularly in known manner (not shown) on to head 50 so as to oscillate in any direction in relation to head 50 and about the center of surface 51, but not to rotate about the axis of shaft 43. Fixed ring 58 is fitted in rotary manner, via the interposition of bearings 59, with an outer ring 60 hereinafter referred to as the "rotary ring."

By means of spherical joints 62 (only one of which is shown) equal in number to blades 4, the bottom of fixed ring 58 is connected to the top end of respective pitch change control rods 63 extending downwards inside an annular gap 64 between the inner surface of shaft 2 and the outer surface of shaft 43.

From the outer surface of rotary ring 60 there project radially outwards a number of arms 65 (only one of which is shown) equal in number to blades 4; and a number of forks 66 (only one of which is shown) for connecting rotary ring 60 to annular body 21 by means of a respective link 67.

Each arm 65 extends over the top end of body 5 and radially outwards of the same, and is connected to a respective fork 41 by a respective connecting rod 68 extending through a respective opening 69 formed through flange 16 of body 14.

The manner in which rods 63, oscillating plate assembly 56, arms 65, connecting rods 68 and forks 41 provide for varying the cyclic and collective pitch of blades 4 is known and therefore requires no further explanation. Needless to say, the so-called "internal-transmission" device 42 described herein, i.e. featuring a fixed internal shaft 43, rods 63 and oscillating plate assembly 56 located substantially inside shaft 2, may be replaced, by any technician in this particular field, with a known so-called "external-transmission" pitch change device (not shown).

Some mention should be made, however, of certain structural and operating characteristics of the connection between blades 4 and hub 3.

The foremost structural characteristic of rotor 1 as described herein consists of toroidal body 14, which provides for achieving an extremely compact, aerodynamically "clean" rotor.

Even using a relatively small-diameter hub 3 involving a relatively small distance between the focal point B of each blade and axis 7 (hereinafter referred to as "distance B-7") and, therefore, theoretically, a relatively small control moment, rotor 1 provides, in actual fact, for achieving relatively substantial control moments by virtue of local axial deformation of toroidal body 14. Said reduction in distance B-7, for a given control moment, provides for considerably reducing vibration of the rotor and, consequently, of the helicopter itself. Distance B-7, in fact, is also proportional to the moments generated by the alternating shear transmitted by the blades and resulting from continual dissymmetry of the dynamic and aerodynamic forces applied to the same. Moreover, the structural characteristic whereby axis 23 of each blade 4, on said stabilized hovering cone, intersects point "K", provides for minimizing the variation, during flapping, in the distance between the center of gravity of each blade 4 and axis 7, which variation is substantially equal to that of an articulated rotor. The same structural characteristic also provides for minimizing flapping of bearings 35 (the movement of inner shoe 37 in relation to outer shoe 36 in the direction of axis 7).

As regards stress transmission, elastomeric bearings 33 transmit to annular body 5 part of the shear caused by both lift and drag. The centrifugal forces applied to blades 4, on the other hand, are transmitted by elastomeric bearings 35 to toroidal body 14 which, being substantially in the form of a closed ring, absorbs the centrifugal forces via internal compensation.

In connection with the above, it should be pointed out that the spherical design of elastomeric bearings 35 was selected to enable them, not only to transmit the centrifugal forces to toroidal body 14, but also, and equally importantly, to enable cyclic and collective pitch change control of blades 4, to enable flapping and dampen the lead-lag movements of blades 4 in the plane perpendicular to axis 7, and to support blades 4 when the rotor is idle. Rotor 1 thus provides for dispensing with both external dampers and blade supporting devices which, in addition to complicating the overall structure of rotor 1, would also result in a substantial increase in aerodynamic drag.

Needless to say, the many functions bearings 35 are called upon to perform necessarily involve structural trade-offs. In fact, for a given size of rotor 1, an increase in distance B-C results in an increase in the resisting moment for supporting the blades when the rotor is idle, but also in a reduction in the radius of bearings 35 and, therefore, in their ability to withstand and transmit the centrifugal forces to toroidal body 14. Last but not least, it should be pointed out that toroidal body 14, by interconnecting blades 4, substantially eliminates any danger of ground dynamic instability arising.

Figure 3:
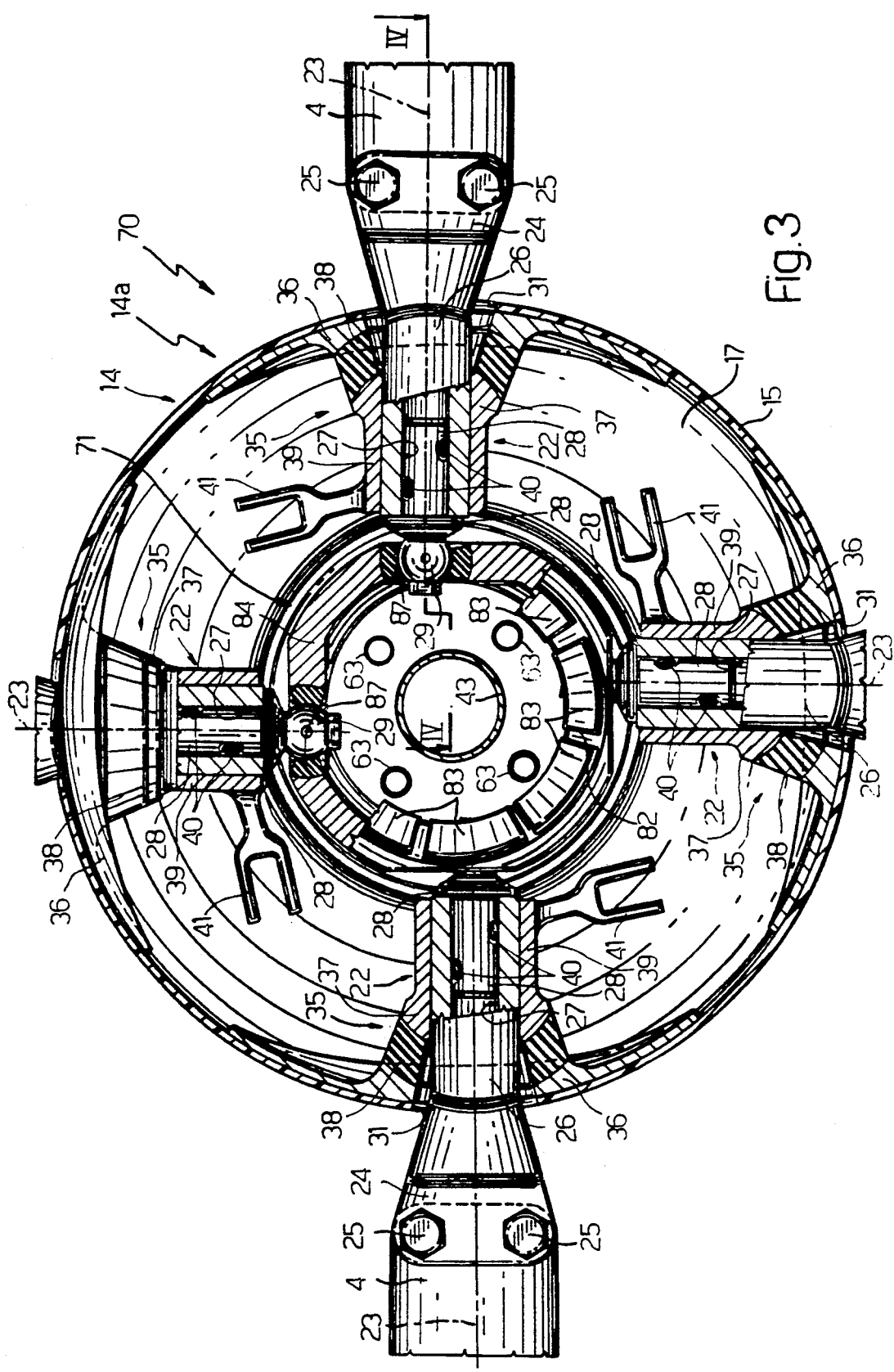
FIG. 3 shows a cross section, with parts removed for simplicity, of a second preferred embodiment of the helicopter rotor according to the present invention.
Figure 4:
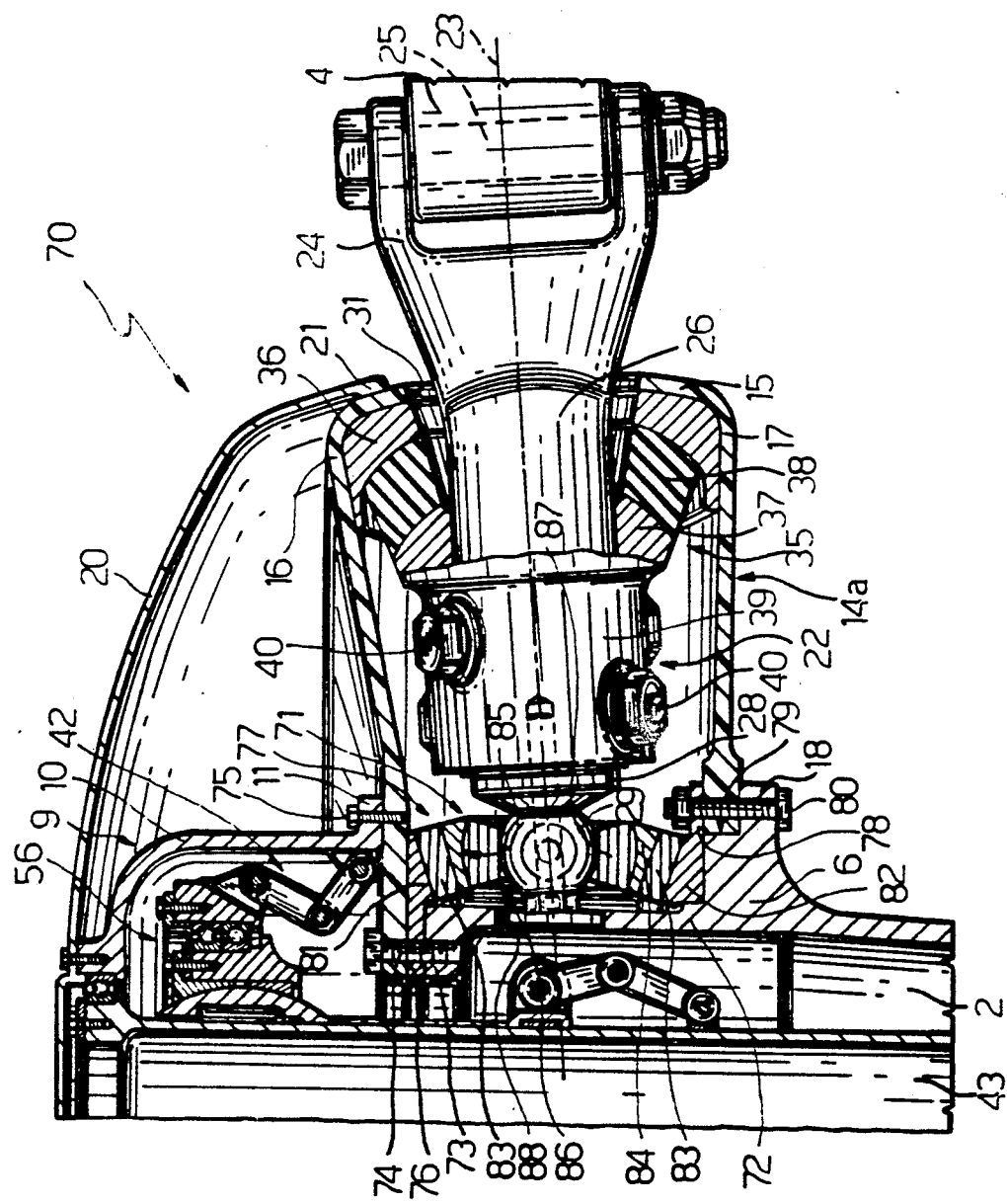
FIG. 4 shows a half section along line IV—IV in FIG. 3.

FIGS. 3 and 4 show a rotor 70 substantially similar to rotor 1 and the corresponding parts of which are indicated using the same numbering system.

Rotor 70 differs from rotor 1 substantially as regards the structure of annular body 5 which, in the case of rotor 70, is indicated as a whole by 71, and comprises an annular body 72 extending upwards from an annular projection 6 on the top end of shaft 2. Annular body 72 is cylindrical, coaxial with axis 7, and constitutes an end extension of shaft 2 with which it is formed in one piece.

On top, annular body 72 presents an annular inner flange 73, to the upper surface of which is connected, by means of screws 74, the inner edge of top flange 16 of toroidal body 14. Flange 16 in turn supports bell 9, the bottom flange 11 of which is connected to flange 16 by a number of screws 76.

As shown in FIG. 4, between flanges 73 and 16, screws 74 grip the top inner flange 76 of an annular elastomeric bearing 77 coaxial with annular body 72 and constituting, with body 72, annular body 71. Bearing 77 presents a bottom outer flange 78 contacting the upper surface of annular projection 6 and defining, with flange 18 of projection 6, a groove 79 fitted through with screws 80 for connecting flange 78 to flange 18 with the interposition of the inner edge of flange 17.

Flanges 76 and 78 of bearing 77 are integral with respective coaxial rings 81 and 82 constituting the outer shoes of bearing 77 and connected, by respective numbers of blocks 83 of elastomeric material, to the opposite ends of an intermediate ring 84 having, for each blade 4, a spherical-ring-shaped through hole 85 coaxial with respective axis 23. Ring 84 constitutes both the inner shoe of bearing 77 and the common outer shoe of a number of spherical elastomeric bearings 86 equal in number to blades 4 and each comprising an annular layer 87 of elastomeric material integral with the inner surface of respective hole 85 and with the outer surface of spherical head 29 of respective connecting element 22 arranged facing a respective radial hole 88 formed through annular body 72.

Rotor 70 therefore differs from rotor 1 substantially as regards provision of bearing 77, the main function of which is to partially relieve bearings 35 when these function as dampers for dampening horizontal movement of the blades.

I claim:

1. A main helicopter rotor (1) (70) of the type comprising a drive shaft (2) designed to turn about its axis (7); a hub (3) integral with the drive shaft (2); a number of blades (4) extending substantially radially outward from the hub (3) and each having a connection device (22) for connection to the hub (3); a pitch change device (42) connected to each said connecting device (22); and means for connecting each said connecting device (22) to the hub (3); said connecting means comprising a first spherical deformable bearing (33) (86) located between a respective connecting device (22) and the hub (3) and defining the focal point (B) of a respective blade (4); characterized by the fact that said hub (3) comprises an annular body (5) (71) integral and coaxial with said drive shaft (2), and an elastically deformable torodial body (14) surrounding and connected to said annular body (5) (71), so as to define, with the same, a closed-section torodial assembly (14a); each said connecting device (22) extending through said torodial body (14) at least partially through said annular body (5) (71); and said connecting means comprising a second spherical deformable bearing (35) located between a respective said connecting device (22) and said torodial body (14), each said first spherical bearing (33) (86) being located between a respective said connecting device (22) and said annular body (5) (71), for each such connecting device (22), said annular body (5) presenting a hole (30); and each said hole (30) housing a respective said first spherical elastomeric bearing (33).

2. A rotor as claimed in claim 1, characterised by the fact that said toroidal body (14) presents a substantially C-shaped section with its concave side facing said axis (7), and comprises a substantially cylindrical, intermediate annular portion (15), and a first and second annular flange (16, 17) extending substantially radially inwards from the respective top and bottom ends of said intermediate annular portion (15); said annular body (5) (71) presenting a top and bottom end portion respectively integral with said first and second annular flanges (16, 17) for defining said closed-section toroidal assembly (14a).

3. A rotor as claimed in claim 1, characterised by the fact that at least one of said annular flanges (16, 17) is conical with its concave side facing outwards.

4. A rotor as claimed in claim 1, characterised by the fact that the center (C) of each said second spherical bearing (35) is located between said respective focal point (B) and said toroidal body (14).

5. A rotor as claimed in claim 1, characterized by the fact that said annular body (71) comprises an inner annular body (72) and an outer annular deformable bearing (77) coaxial and integral with each other; said inner annular body (72) being integral with said drive shaft (2); and said outer annular bearing (77) being located outside said inner annular body (72) and connected to each said connecting device (22) via a respective said first spherical bearing (86).

6. A rotor as claimed in claim 5, characterized by the fact that said outer annular bearing (77) comprises an annular inner shoe (84) coaxial with said inner annular body (72), and elastic means (83) for connecting said annular inner shoe (84) to said inner annular body (72); said first bearings (86) interconnecting said connecting devices (22) and said annular inner shoe (84).

7. A rotor as claimed in claim 6, characterized by the fact that said first spherical bearings (86) present a common outer shoe consisting of said inner shoe (84) of said outer annular bearing (77).

8. A rotor as claimed in claim 6, characterized by the fact that said outer annular bearing (77) comprises two annular outer shoes (81, 82) located on opposite sides of said inner show (84) and integral with said inner annular body (72); said outer annular bearing (77) comprising a number of blocks (83) of deformable material located between each said outer shoe (81, 82) and said inner shoe (84).

9. A rotor as claimed in claim 3, characterised by the fact that said annular flanges (16, 17) are so shaped that the generating lines lying in a plane through an axis (23) of said blade (4) and through the axis (7) of said drive shaft (2) meet at a point (K) located on said axis (23) of said blade (4) when said blade (4) is located on the stabilized hovering cone.

* * * * *